United States Patent
Dirsch et al.

(10) Patent No.: US 8,427,658 B2
(45) Date of Patent: Apr. 23, 2013

(54) METHOD FOR THE AUTOMATIC DETECTION OF AT LEAST ONE PROPERTY OF AT LEAST ONE COMPONENT OF AN APPARATUS FOR THE PRODUCTION OF PRINTED PRODUCTS

(75) Inventors: Bernhard Dirsch, Erlangen (DE); Stephan Karl, Eichstätt (DE); Lothar Rettner, Erlangen (DE); Jochen Schlinkert, Höchstadt/Aisch (DE)

(73) Assignee: Siemens Aktiengesellschaft, München (DE)

( * ) Notice: Subject to any disclaimer, the term of this patent is extended or adjusted under 35 U.S.C. 154(b) by 1053 days.

(21) Appl. No.: 12/378,207

(22) Filed: Feb. 12, 2009

(65) Prior Publication Data
US 2009/0213420 A1   Aug. 27, 2009

(30) Foreign Application Priority Data

Feb. 14, 2008 (EP) .................. 08002770

(51) Int. Cl.
*G06F 3/12* (2006.01)
(52) U.S. Cl.
USPC .......................................... 358/1.1
(58) Field of Classification Search ........... 358/1.1, 358/1.6; 400/625; 101/174, 232, 424.1, 101/368; 270/1.01, 21.1, 45, 58.26; 347/85, 347/86, 87, 50, 19, 7; 340/10.1, 572.8; 156/190, 156/191, 195, 238; 700/1
See application file for complete search history.

(56) References Cited

U.S. PATENT DOCUMENTS

| | | | |
|---|---|---|---|
| 5,491,540 A | 2/1996 | Hirst | |
| 6,027,270 A * | 2/2000 | Greive | 400/625 |
| 6,467,888 B2 * | 10/2002 | Wheeler et al. | 347/85 |
| 7,912,570 B2 * | 3/2011 | Lehrieder | 700/123 |
| 2002/0144617 A1 * | 10/2002 | Compton et al. | 101/424.1 |
| 2003/0025027 A1 | 2/2003 | Ebisawa et al. | |
| 2004/0239706 A1 | 12/2004 | Kawakami | |
| 2007/0063013 A1 | 3/2007 | Marowski et al. | |
| 2007/0069856 A1 * | 3/2007 | Lee | 340/10.1 |
| 2007/0151660 A1 * | 7/2007 | Adams et al. | 156/238 |
| 2008/0011173 A1 * | 1/2008 | Rossini et al. | 101/368 |

FOREIGN PATENT DOCUMENTS

| | | |
|---|---|---|
| EP | 1 060 895 A1 | 12/2000 |
| EP | 1 647 406 A1 | 4/2006 |

* cited by examiner

*Primary Examiner* — Charlotte M Baker

(57) ABSTRACT

A method for the automatic detection of at least one property of at least one replaceable component of an apparatus for the production of printed products is disclosed and such an apparatus and a system for the production of printed products are disclosed. The property of the component of the apparatus or of the system is detected by using an electronic device for a wireless detection of component-related data.

8 Claims, 1 Drawing Sheet

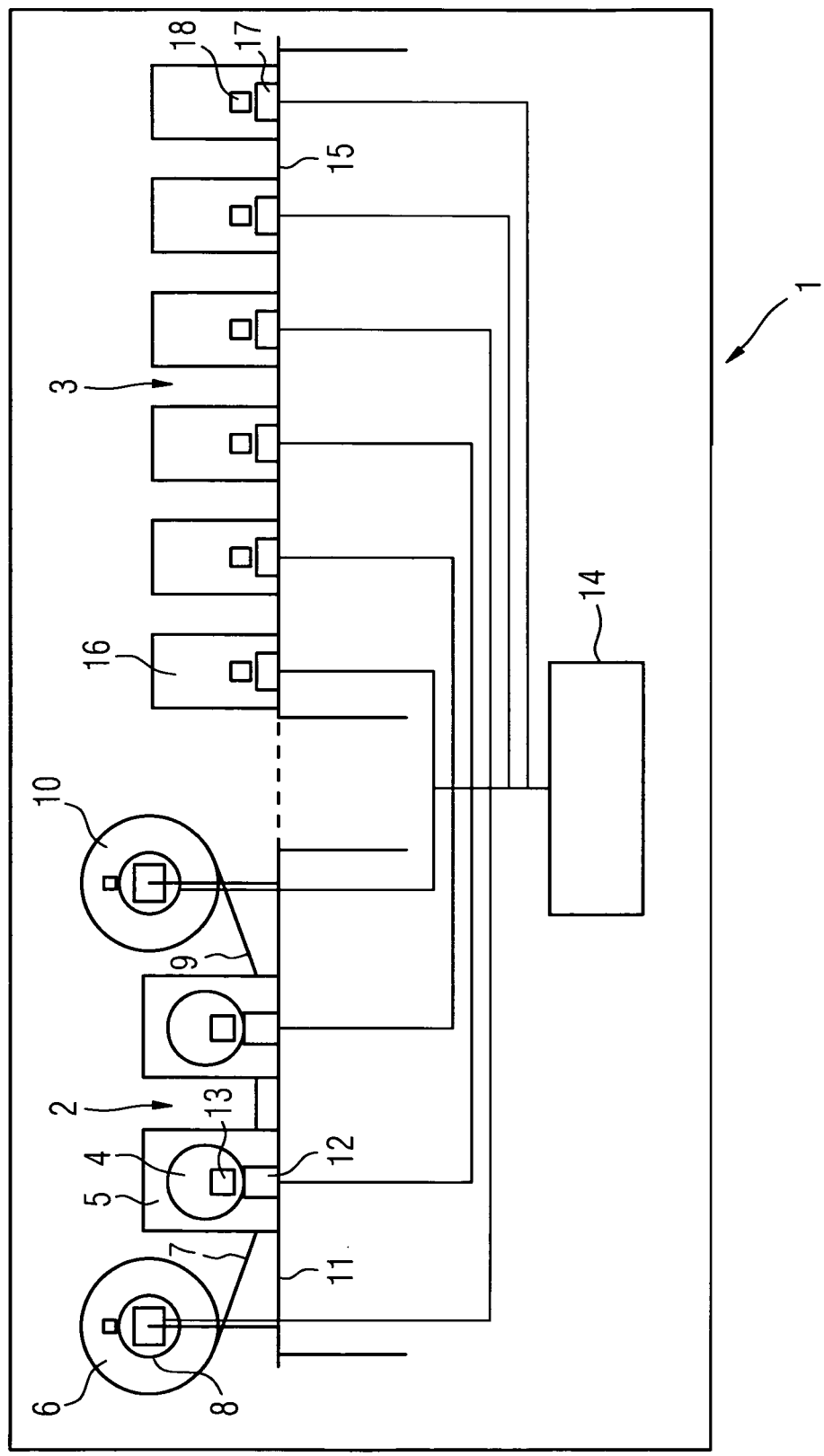

METHOD FOR THE AUTOMATIC DETECTION OF AT LEAST ONE PROPERTY OF AT LEAST ONE COMPONENT OF AN APPARATUS FOR THE PRODUCTION OF PRINTED PRODUCTS

CROSS REFERENCE TO RELATED APPLICATIONS

This application claims priority of European Patent Office application No. 08002770.9 EP filed Feb. 14, 2008, which is incorporated by reference herein in its entirety.

FIELD OF INVENTION

The invention relates to a method for the automatic detection of at least one property of at least one component of an apparatus for the production of printed products and to such an apparatus and a system for the production of printed products.

According to this invention, the term "printed products" means various products of the print industry, the range of products covered by this term extending from printed material up to a complete periodical, a booklet or similar.

BACKGROUND OF INVENTION

Examples of apparatuses of the generic type are printing presses designed for printing material. For this purpose, the unprinted material is usually present as sheet material which normally consists of suitable paper and for printing it is usually unwound from a roller, on which the sheet material can also be stored. A roller of this kind with this sheet material wound onto it is also generally known as an "unwinder" if the material on the roller is being fed for production. After unwinding, the sheet material is printed by means of suitable printing devices, such as a printing cylinder or several printing cylinders. The rewinding of the sheet material onto a roller after printing to enable ease of transport and/or suitable storage of the printed material is also known, with a roller of this kind also being termed a "rewinder".

Furthermore, combined binding lines are known as apparatuses of the generic type which can be used in the course of the printing process or the postprinting process. After suitable cutting to size, the printed products produced by the printing press are fed, for example, to a combined binding line which combines the individual cut material, for example to form a periodical or similar. This further processing of the printed products produced by means of a printing press usually takes place by using a large number of connected stations, with it being possible to use various types of connected stations which are chosen in a suitable number according to the particular purpose of the apparatus.

SUMMARY OF INVENTION

The apparatuses described above are manually, i.e. by operators, fitted with suitable components, for example with at least one of the components, an unwinder or winder, described above, with which the required working and/or processing of material can take place. Apparatuses according to the prior art are unable to perform a desired automatic monitoring of the proper apparatus configuration, which means that a configuration can often be faulty, which leads to considerable waste and associated additional costs. Furthermore, it would be desirable if replaceable system components held information regarding their previous use, in order to make any such operating data available for the preventive maintenance of the relative apparatus, for example, to enable a requirement for an early component replacement to be detected in good time so that suitable precautionary measures can then be taken in time to reduce the downtime caused by the replacement.

Therefore it is an object of this invention to provide a method for the automatic detection of at least one property of at least one replaceable component of an apparatus for the production of printed products, with which a fault-free operation of the apparatus with very short downtimes can be realized.

This object is achieved according to the invention by a method, an apparatus and a system according to the independent claims. Advantageous embodiments of the method are given in the dependent claims.

It is provided that the automatic detection of at least one property of at least one replaceable component of the apparatus takes place using at least one electronic device for the wireless detection of component-related data. By means of the device for the wireless detection of component-related data, a unidirectional, or also bidirectional, exchange of information can take place, by means of which at least one property of at least one component of the apparatus can be detected and furthermore the component can also provide information with respect to its use, i.e. its previous operating data. On the one hand, this enables the job-related configuration of the apparatus to be checked in order to eliminate the susceptibility to mistakes when fitting the component to the apparatus. On the other hand, preventive maintenance of the apparatus can take place in that the operating data also provided by a component can be detected. This enables other possible uses of the component to be determined and any downtimes of the apparatus, which for example would be necessary for the replacement of a component rendered unserviceable through use, to be minimized, so that the operation of the apparatus can be much more efficient and therefore more cost-effective.

The detection of several properties of a component, which are suitable for achieving the aforementioned objectives, is also possible. For example, the previous service life or the type of previous use of the component can be detected, thus enabling information to be obtained regarding further possible uses for the component. Such information can, for example, be provided at the end of a preceding use of the component and thus be available for further use.

Furthermore, several components, of which at least one property can be automatically detected in each case, can be used. To this end, the use of several electronic devices for the wireless detection of component-related data is advantageous, especially where replaceable components are present for a number of such apparatuses. Replaceable in this case means that the components are those units of the apparatus which can be replaced by suitable replacements to adapt the apparatus to the purpose required for the task, or that a component that has become unserviceable can be replaced by a serviceable component. This can, for example, be necessary in the case of an unwinder if all of the material has been unwound from it and the unwinder is thus unusable for further production.

According to an advantageous embodiment of the invention, the type of component is detected as the property. In particular, this embodiment enables the fitting of the apparatus with one or more replaceable components to be checked, i.e. to determine whether at least one component suitable for a specific use of the apparatus is present. For example, the apparatus can then be enabled if the check of the configuration of the apparatus shows that the components suitable for a specific use of the apparatus are fitted to the apparatus.

A further advantageous embodiment of the invention provides that operating data of the component is detected as the property. This embodiment serves for preventive maintenance of the apparatus in that information on the previous use of the component can be obtained from the operating data and further possible applications of the component can therefore be calculated, so that, for example, an upcoming unserviceability of the component can be detected early and measures can thus be taken before the occurrence of the unserviceability to replace the unserviceable component by a serviceable component as quickly as possible and thus reduce as far as possible the downtime of the apparatus. Moreover, it is conceivable that both the type of a component and its operating data are detected as properties, which in addition to checking the configuration of the apparatus also guarantees efficient utilization of the apparatus at the same time, in that the downtime of the apparatus required to replace a component that has become unserviceable is reduced to a minimum.

A further advantageous embodiment of the invention proposes that a read/write storage device is fitted to the component and a transceiver is fitted to a stationary base unit of the apparatus. This arrangement of the devices for wireless detection of component-related data is also a very simple and cost-effective solution for the automatic detection of at least one property of the at least one component, in that to detect the property of the component the read/write storage device can be read by means of the transceiver and be written to in order to supply operating data with respect to the previous use of the component. In this way, the properties, such as the component type and component-specific operating data stored in the storage unit can be read, which can then be processed for efficient utilization of a corresponding apparatus.

According to a further advantageous embodiment of the invention, the transceiver is arranged at the specified position of the component on the apparatus. In this case it is especially possible, in addition to a property of the component, to also detect its position on the apparatus in a simple manner, in that the transceiver is assigned a specific position on the apparatus so that when a property of a component is detected by the transceiver this information also contains position information. This can then be advantageous if several types of components which should be arranged at specific positions for the particular purpose of the apparatus are arranged on the apparatus. An efficient check of the configuration of a corresponding apparatus can thus take place in that which component type is arranged at which position on the apparatus is detected. This prevents an incorrect configuration of the apparatus, with it being possible at the same time to achieve a very efficient utilization of the apparatus by additionally detecting component-specific operating data.

In an advantageous manner, it is further developed in that the detected property is transmitted to a control unit for further processing. By further processing of properties carried out by the control unit, such as the component type or component-related operating data, a check of the configuration can take place by means of a suitable processing software and/or electronic system, with the efficiency of the apparatus thus being significantly increased.

It is advantageous if the property is checked against predetermined desired data by means of the control unit, thus enabling the configuration of the apparatus to be very easily checked, for example if the control unit has a desired configuration for the apparatus which has been designed for a specific application related to the task. If then one of the components specified by the desired configuration is arranged on a stationary base unit of the apparatus, for example on a machine base, the type of component can then be automatically detected by means of the device for the wireless detection of computer-related data. This type of data can be sent to the control unit together with the position data of the transceiver, with the control unit being able to immediately detect, by comparing the desired and actual configuration, whether a component type suitable for achieving the particular application of the apparatus is fitted at the detected position on the stationary base unit. In this way, a configuration of any number of components which can be arranged on the stationary base unit can be easily checked. This enables printed products to be produced with the minimum amount of waste, thus reducing the production costs of these printed products. The efficiency of the apparatus can be further increased by detecting and processing component related operating data, in that any downtimes for the apparatus can be minimized.

It is further proposed that to control the apparatus the control unit generates control signals based on the results of the comparison. For example, an enabling of the apparatus can only take place by means of a control signal if a suitable configuration of the apparatus has been determined by means of the comparison, i.e. the desired configuration present in the control unit agrees with the detected actual configuration. It is also conceivable that the detection of a faulty actual configuration of the apparatus is signaled in some other way.

Furthermore, by processing component-related data it can, for example, be determined whether a component will soon become unserviceable. If this is detected using the detected operating data and a suitable processing of such data, the control unit can output a corresponding message signal, which for example, indicates to the operator that an upcoming component replacement is required. The preparations necessary for a replacement can then be properly made, thus minimizing the time required for replacement of the component and therefore the downtime of the apparatus. Furthermore, after determination of the timepoint of a required replacement of a component that has become unserviceable on the basis of the detected operating time of the component, the control unit can stop the apparatus at a suitable timepoint, which also enables the production of waste to be successfully avoided.

Furthermore, it is considered advantageous if by means of the control unit and the transceiver unit operating data is sent to the read/write storage unit and is stored there. For example, the operating duration or similar of the component can be determined on the apparatus by means of the control unit and transmitted to the component via the device for the wireless detection of component-related data, so that the operating information can also be given to the component and this information can be retrieved for processing the next time the component is used, which, as described above, has a very positive effect on the productivity and efficiency of the apparatus.

According to a further proposal, an RFID system is used as the electronic device for the wireless detection of component-related data, with an RFID transponder fitted with a read/write storage unit being arranged on the component and an RFID transceiver being arranged on the apparatus. This embodiment is a simple, cost-effective solution by means of which the aforementioned advantages of automatic detection of at least one property of at least one component of an apparatus for the production of printed products can be achieved. Alternatively, a different design of electronic device can also be used, which, for example, has flash chip elements as storage units and, for example, Bluetooth interfaces. Thus, there is proposed a method for the automatic detection of at least one property of at least one component of an apparatus for the production of printed products, which in a simple manner enormously increases the productivity and efficiency of the apparatus at low cost.

To achieve the above objective, there is furthermore provided an apparatus for the production of printed products, which has a stationary base unit and several components that can be arranged thereon. By means of this apparatus, a great variety of printed products can be produced, with it being possible to match the type of components to the particular application, i.e. the particular product series, in that certain component types are arranged in a suitable quantity at specified positions on the stationary base unit.

The apparatus has at least one electronic device for the wireless detection of component-related data. This enables the aforementioned advantage to be achieved in that at least one property, for example the component type or component-related operating data, of the at least one component can be detected for checking the correct configuration of the apparatus, which thus substantially increases the productivity of the apparatus. A further property that can be detected, for example for an unwinder, is what material type and what quantity of the material is held on the unwinder.

According to an advantageous embodiment of the invention, the electronic device for the wireless detection of component-related data has a read/write storage unit and a transceiver, with the read/write storage unit preferably being arranged on a component and the transceiver preferably being arranged on the stationary base unit. In this way, it can be provided that the transceiver is arranged at the specified position of the component on the apparatus, so that in addition to the property of the component its position on the apparatus, especially on the stationary base unit, can be detected, which is advantageous, especially where the apparatus has a large number of components, because this enables which component is fitted and at which position on the stationary base unit to be detected.

In an advantageous manner, the electronic device for the wireless detection of component-related data is an RFID system with an RFID transponder and an RFID transceiver, which is a very cost-effective embodiment of the apparatus. However, as described above, other suitable embodiments can also be used.

In accordance with a further advantageous embodiment of the invention, the apparatus has a control unit by mean of which the detected data, for example the type of component and its position on the stationary base unit and other operating data, can be processed, for example in order to compare a predetermined desired configuration of the apparatus with the existing actual configuration. According to the process already described, waste due to a faulty configuration of the apparatus is avoided and also long downtimes are avoided, which thus provides the apparatus with a very high productivity and efficiency.

According to a further advantageous embodiment of the invention, the apparatus is a printing press and the component is an unwinder device, a rewinder device and/or a printing cylinder. In particular, each of these components can have an RFID transponder in order to be able to detect specific properties of the component by means of RFID transceivers, which are preferably arranged in each case at the specified position of the relevant component on the stationary base unit. The unwinder device corresponds essentially to a known unwinder, and the rewinder device essentially corresponds to a known rewinder.

It is, for example, possible to detect when the position for an unwinder unit is occupied with such an unwinder unit and also the type of unwinder unit. Moreover, the type of material loaded on the unwinder unit and how much of this type of material is actually present on the unwinder unit can be stored in the memory of the RFID transponder of the unwinder unit. It is even possible that an unwinder unit has already been used in the course of previous production but that the material on the unwinder unit was not used up. In this case, it is desirable if the amount of material still on the unwinder unit can be determined, in order, for example, to calculate when replacement of the unwinder unit has to take place when it has become unusable after dispensing all of the material.

For this purpose, to shorten the downtime of the apparatus necessary for this purpose, precautions, such as the delivery of another unwinder unit, can be arranged and carried out in good time, thus providing the apparatus with a very high productivity and efficiency.

The detection of the properties of a rewinder unit and its position on the stationary base unit also has the aforementioned advantage. For example, by means of the type of rewinder unit it can be determined how much material and what kind of material can be wound onto the rewinder unit and/or has already been wound onto said unit, with it being possible by means of the control unit to calculate when the rewinder unit is full and therefore when a replacement of the rewinder unit by a rewinder unit with less or even no material should take place. By means of this calculation of the time-point of an upcoming replacement of the rewinder unit, the measures necessary for this can also be taken in good time. If the rewinder unit containing material in a specific quantity is to be provided for further processing of the material, the type of material on the rewinder unit and its quantity can be determined by means of an RFID system, which thus also simplifies the processing of the material printed by the printing press.

Furthermore, at least one property of at least one printing cylinder can also be detected, with, for example, the print motif arranged on the printing cylinder being detected as the property. This is of particular interest on gravure printing presses for which at least one gravure printing cylinder is provided with an engraved print motif.

Further advantageous embodiments of the invention is provided in that the apparatus is a machine for print processing and/or print postprocessing and the component is a connected station. Such machines are, for example, combined binding lines, which are used mainly in the production of printed products such as periodicals, booklets and for similar applications. Such machines are provided with a suitable number of connected stations depending on the particular task, with the type of connected stations varying. Especially with such machines, it is desirable to be able to check the configuration of the machine, in that which position of the machine is occupied by what type of connected station can be automatically detected. This check can be easily carried out by using several RFID systems and a control unit connected thereto, with, for example, each of the existing positions of the stationary base unit of the machine at which a connected station can be arranged being fitted with an RFID transceiver. If a connected station is now arranged at such a position, it is thus possible by comparing a predetermined desired configuration with an actual configuration detected by means of the RFID system to determine by means of the control unit whether the required type of connected station is arranged at the specified position on the stationary base unit of the machine, in order to satisfy the particular purpose of the apparatus or machine.

A system for the production of printed products is also proposed as a solution to the above task, with the system consisting of a predetermined printing press and a predetermined apparatus for the processing of printed products, with the system having a winder unit, a rewinder unit, at least one printing cylinder and at least one connected station. This system is thus fitted with very many components, which makes it especially necessary for all components to be arranged at the specified position in the system and to be of the type suitable for the purpose of the system. The automatic checking of the correct configuration of the system, which is desirable for this purpose, can be achieved in a simple manner by the arrangement of a suitable number of RFID systems and their predetermined interaction with a control unit.

A use of an RFID system for the automatic identification of at least one component of a system for the production of printed products is also proposed, by means of which use the advantages described above can be achieved.

BRIEF DESCRIPTION OF THE DRAWINGS

Further advantages and features of this invention are given in the following with the aid of a drawing. The drawing is as follows:

FIG. 1 a schematic representation of an exemplary embodiment for the inventive system for the production of printed products.

DETAILED DESCRIPTION OF INVENTION

FIG. 1 is a schematic exemplary embodiment of the inventive system 1 for the production of printed products, with said system 1 being suitable, for example, for the production of periodicals or similar. The left side of FIG. 1 shows, as a variant of the embodiment of the inventive apparatus, a printing press 2, with a combined binding line 3 being shown on the right side of FIG. 1 as an example of an embodiment of the inventive apparatus.

In the embodiment variant shown, the printing press 2 has two printing cylinders 4, each of which is provided with a print motif matched to the specified purpose of the system 1. To perform their function, the printing cylinders 4 are each arranged on a mounting device 5. The printing press 2 also has an unwinder unit 6 designed as a roller 8 on which a sheet of material 7 is wound. The sheet of material 7, which in the exemplary embodiment consists of paper suitable for the purpose of the system 1, is fed to the printing cylinders 4 for printing and is provided with the required imprint by these printing cylinders 4, so that a first printed product can be produced by the printing press. After printing the material sheet 7, the printed material sheet 9 is, in the exemplary embodiment shown, fed to a rewinder unit 10, which is also designed as a roller 8 on which the printed material 9 is wound. By winding the printed material sheet 9 it can be supplied directly for further processing or easily stored for subsequent use.

Several RFID transceiver units 12 are arranged on the stationary base unit 11 of the printing press 2 at specified positions of the unwinder unit 6, printing cylinders 4 and rewinder unit 10 components. Component-related data regarding the unwinder unit 6, printing cylinders 4 and rewinder unit 10 components is detected by the RFID transceiver units 12 and stored in a read/write storage unit of the RFID transponder 13 which are arranged on the respective components. Examples of the properties of the unwinder unit 6 which can be detected by the RFID system from the RFID transponder and RFID transceiver unit are the type or quality of the material held on the unwinder unit and also its quantity. For the printing cylinders 4, the print motif arranged on them can, for example, be detected and stored as information in the storage unit of the RFID transponder. The rewinder unit 10 can on the other hand provide information via the RFID transceiver unit regarding the amount of material wound onto it and its nature, with corresponding data being written to the storage unit of the RFID transponder. If the rewinder unit 10 is used for further processing, the information stored in the storage unit can be read again, in order to ensure the most efficient production sequence possible.

Furthermore, it is also possible to detect how much material is still on the unwinder unit 6. Using this information, a control unit 14 connected to the RFID transceiver can calculate when a replacement of the unwinder unit 6 should take place, in order to initiate the necessary measures in good time, so that the downtime of the printing press 2 is minimized. On the other hand, the control unit 14 can carry out a comparison of a predetermined desired configuration of the printing press 2 with a detected actual configuration, so that the printing press is not enabled until there is agreement between the actual and desired configurations. This prevents the printing press 2 being brought into operation even though a printing cylinder 4 which is incorrect for the particular purpose of the printing press 2 has been fitted to the printing press 2 by operators, which would lead to a high wastage and associated subsequent costs.

It can already be seen here that a very efficient production of printed products at low cost is possible by the method and the apparatus, i.e. by means of the printing press 2.

The right part of FIG. 1 shows an exemplary embodiment of an inventive apparatus designed as a combined binding line 3. This also has a stationary base unit 15 on which six connected stations 16 are arranged in the configuration shown. Each of the connected stations 16, which can differ from each other with regard to type, is arranged at a predetermined arrangement position on the base unit 15, with each of these positions being provided with an RFID transceiver unit 17, which is also connected to the control unit 14. The connected stations 16 each have an RFID transponder 18 which, for example, can have type data and other component-related data in its storage unit. By means of the control unit 14, the correct configuration of the combined binding line 3 can now be checked in that a comparison of the desired and actual configuration data can be used to determine whether connected station types suitable for the particular purpose of the combined winding line 3 are present and whether these are arranged at the specific position on the base unit 15. The previous operating duration or the material still present in the connected station 16 can, for example, be detected as other properties of the connected stations 16, so that preventive maintenance of the combined binding line 3 can take place on the basis of this information and a suitable processing of such information by means of the control unit 14 can be carried out.

It can also be seen here that a very efficient production of printing products can take place at low cost by the method and the apparatus.

FIG. 1 shows a complete system 1, which of course can also have other components such as packaging devices or similar, with the system 1 being characterized by high productivity and efficiency.

The exemplary embodiments described with the aid of FIG. 1 are used for explanation and are not restrictive.

The invention claimed is:

1. A method for the automatic detection of component-related data of at least one replaceable component of an apparatus for the production of printed products, comprising:

providing replaceable printing components including an unwinder unit, a rewinder unit and a printing cylinder, using at least one of the replaceable printing components for a wireless detection of component-related data of the at least one replaceable printing component, providing a first electronic device associated by position with the at least one printing component, wherein the first electronic device comprises the component-relevant data, providing a second electronic device associated by position with a unique location within the apparatus, wherein the first and second electronic devices communicate wirelessly, and wherein, when the at least one printing component with the associated first electronic device is installed within the apparatus, the second electronic device detects the type of the replaceable printing component.

2. The method as claimed in claim 1, wherein operating data of the replaceable printing component is detected.

3. The method as claimed in claim 1, wherein detected component-related data are transmitted to a control unit for processing.

4. The method as claimed in claim 3, wherein the control unit compares the component-related data with desired data.

5. The method as claimed in claim 4, wherein the control unit produces control signals for controlling the apparatus based upon the result of the comparison.

6. The method as claimed in claim 1,
wherein the first and second electronic devices comprise RFID systems.

7. A system for the production of printed products, comprising:
system components, comprising:
a printing press;
a combined binding line;
a printing cylinder;
a connected station;
a plurality of first electronic devices, each associated by position with a respective system component, wherein each first electronic device comprises data regarding the respective system component; and
a plurality of second electronic devices, each associated by position with a unique location within the system;
wherein the first and second electronic devices communicate wirelessly, and wherein when a system component with an associated first electronic device is installed in a location within the system, the second electronic device associated with that location detects which system component is installed in the location.

8. The system as claimed in claim 7,
wherein the first and second electronic devices comprise RFID systems.

\* \* \* \* \*